(12) United States Patent
Arunkumar et al.

(10) Patent No.: US 10,157,009 B2
(45) Date of Patent: Dec. 18, 2018

(54) CUSTOM COMMAND FILE FOR EFFICIENT MEMORY UPDATE

(71) Applicant: ARRIS Enterprises LLC, Suwanee, GA (US)

(72) Inventors: Lakshmi Arunkumar, Bangalore (IN); Krishna Prasad Panje, Bangalore (IN); Pradeep Kumar Sahoo, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 85 days.

(21) Appl. No.: 15/203,416

(22) Filed: Jul. 6, 2016

(65) Prior Publication Data

US 2018/0011653 A1    Jan. 11, 2018

(51) Int. Cl.
*G06F 3/06* (2006.01)
*G06F 8/71* (2018.01)
*G06F 8/658* (2018.01)

(52) U.S. Cl.
CPC .......... *G06F 3/0632* (2013.01); *G06F 3/0604* (2013.01); *G06F 3/0659* (2013.01); *G06F 3/0679* (2013.01); *G06F 8/658* (2018.02); *G06F 8/71* (2013.01)

(58) Field of Classification Search
CPC ........ G06F 3/0632; G06F 8/654; G06F 8/656; G06F 8/658; G06F 8/71
See application file for complete search history.

(56) References Cited

U.S. PATENT DOCUMENTS

| 2005/0132382 | A1* | 6/2005 | McGuire | G06F 8/68 719/311 |
| 2010/0325622 | A1* | 12/2010 | Morton | G06F 8/665 717/168 |
| 2011/0041003 | A1* | 2/2011 | Pattar | H04W 12/10 714/4.3 |
| 2011/0154313 | A1* | 6/2011 | Nolterieke | G06F 8/658 717/170 |
| 2012/0324435 | A1* | 12/2012 | Somani | G06F 8/30 717/170 |

(Continued)

OTHER PUBLICATIONS

"Data-Over-Cable Service Interface Specifications; eDOCSIS™ Specification", Document CM-SP-eDOCSIS-126-130808, Cable Television Laboratories, Inc., Aug. 2013.

*Primary Examiner* — Hal Schnee
(74) *Attorney, Agent, or Firm* — Bart A. Perkins

(57) ABSTRACT

Methods, systems, and computer readable media can be operable to facilitate the updating of memory at a device based upon a custom command file. In embodiments, update or configuration codes or data may be delivered to a device within a download package, and the download package may include a command file. The command file may identify one or more operations that are to be carried out on the memory of the device, and each respective one of the one or more operations may be associated with a subset or portion of the memory of the device. The device may identify the one or more operations and the one or more associated memory areas from the command file, and the device may carry out the one or more operations on only those areas of the device memory that are identified from the command file as being associated with the operations.

17 Claims, 4 Drawing Sheets

(56) References Cited

U.S. PATENT DOCUMENTS

| | | | |
|---|---|---|---|
| 2013/0038425 A1* | 2/2013 | Sugiyama | H04L 63/0853 340/5.81 |
| 2013/0179871 A1* | 7/2013 | Nagao | G06F 8/65 717/170 |
| 2014/0007069 A1* | 1/2014 | Cavalaris | G06F 8/665 717/170 |
| 2014/0304694 A1 | 10/2014 | Huff, II et al. | |
| 2015/0355900 A1* | 12/2015 | Crosby | G06F 3/0679 717/168 |
| 2016/0117165 A1* | 4/2016 | Cavalaris | G06F 8/665 717/169 |
| 2016/0191253 A1* | 6/2016 | Pyle | H04L 9/14 380/28 |
| 2016/0216957 A1* | 7/2016 | Yoon | G06F 8/654 |
| 2017/0003956 A1* | 1/2017 | Chang | G06F 8/654 |

* cited by examiner

CUSTOM COMMAND FILE FOR EFFICIENT MEMORY UPDATE

TECHNICAL FIELD

This disclosure relates to generating and delivering a custom command file for updating memory at a device.

BACKGROUND

Flash memory is an important and precious resource for many devices including customer premise equipment (CPE) devices such as set-top boxes (STB) and multimedia gateway devices. Flash memory is susceptible to wear from various uses and changes made to the memory such as code downloads, frequent modifications in a channel map, frequent guide data downloads, and others. Typically, when the flash memory of a device becomes worn out, the device will need to be discarded. In general, even if there is only a small change in code/guide/channel map data that applies to only a portion of flash memory, the entire flash memory of a device is re-flashed.

In some instances, a CPE device can be concurrently targeted for more than one code download. In such instances, the CPE device would continue downloading and toggling between the different code downloads. The continued downloading and toggling may continue for as long as concurrent spooling of different code downloads is not stopped or the CPE device fails to download further. Toggling between different code downloads can lead to an expedited wearing of flash memory as the initiation of a download leads to allocation and writing to the flash memory of a device, and a termination of a download leads to an erasure of the flash memory. Further, if an object size is less than the size of a single sector, then that particular sector may be subject to wear.

Another cause of repeated flash memory updates are code downloads which have corrupted code object(s) (e.g., authentication failure, cyclic redundancy check (CRC) failure, etc.). The corrupted code objects can result in multiple download retries and wearing of flash memory. In this scenario, same code object(s) are downloaded repeatedly as long as spooling of that code download is not stopped or the CPE device fails to download.

Modifications to a channel map and guide (e.g., electronic program guide (EPG)) data downloads may further lead to wear of flash memory. For example, information associated with channels supported by a CPE device is typically stored in flash memory, and each update to the channel map causes an erasure, allocation, and writing at the flash memory. Further, applications are periodically download and stored as guide data associated with supported channels in flash memory, and these periodic downloads may impact the wear of the flash memory as well as other operations and the overall performance of the CPE device.

Therefore, a need exists for improving methods and systems for updating flash memory at a CPE device.

BRIEF DESCRIPTION OF THE DRAWINGS

Like reference numbers and designations in the various drawings indicate like elements.

DETAILED DESCRIPTION

Figure 1:
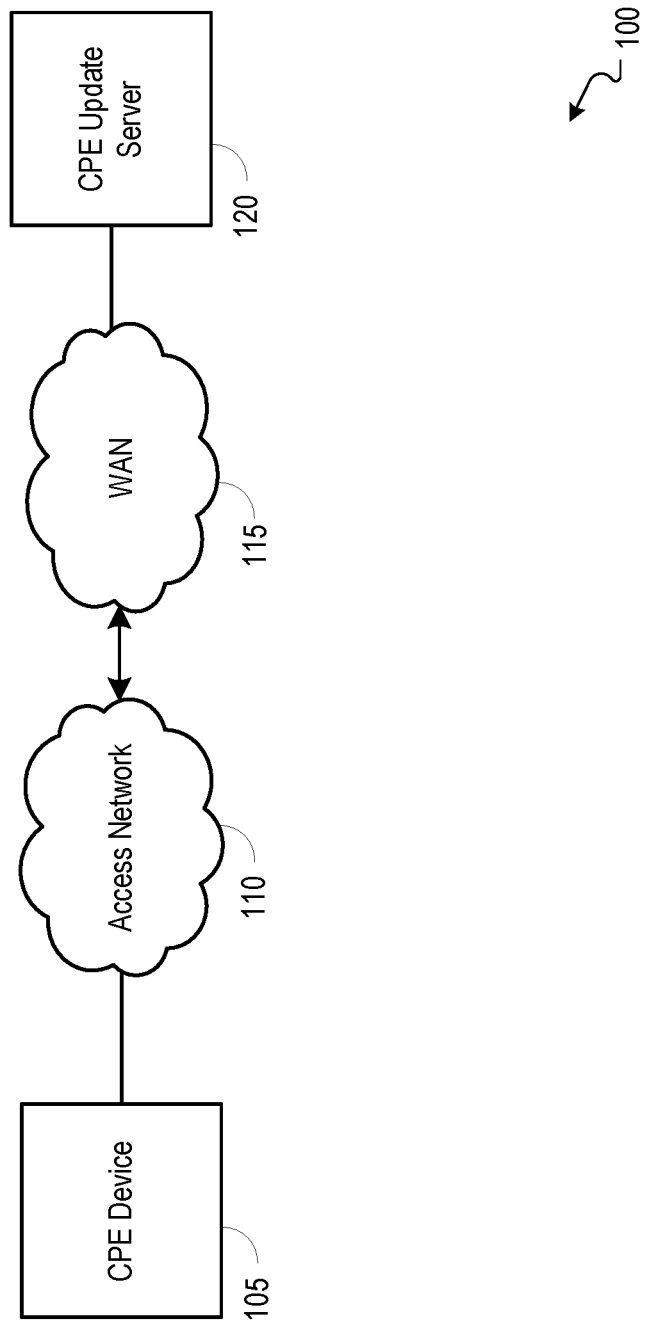
FIG. 1 is a block diagram illustrating an example network environment operable to facilitate the updating of memory at a device based upon a custom command file.

It is desirable to improve upon methods and systems for updating memory at a device. Methods, systems, and computer readable media can be operable to facilitate the updating of memory at a device based upon a custom command file. In embodiments, update or configuration codes or data may be delivered to a device within a download package, and the download package may include a command file. The command file may identify one or more operations that are to be carried out on the memory of the device, and each respective one of the one or more operations may be associated with a subset or portion of the memory of the device. The device may identify the one or more operations and the one or more associated memory areas from the command file, and the device may carry out the one or more operations on only those areas of the device memory that are identified from the command file as being associated with the operations. The methods, systems, and computer readable media described herein provide an optimization and minimization of flash operations, thereby decreasing repeated wear to large sectors of flash memory.

An embodiment of the invention described herein may include a method comprising: (a) retrieving a command file from a download package, wherein the command file is retrieved at a device receiving the download package; (b) identifying one or more operations that are identified within the command file; (c) for each respective one operation of the one or more operations, identifying a memory area associated with the respective one operation, wherein the memory area comprises a portion of memory associated with the device; and (d) performing each of the one or more operations, wherein each respective one operation of the one or more operations is performed on the memory area associated with the respective one operation.

According to an embodiment of the invention, a memory area associated with each respective one operation is identified from the command file.

According to an embodiment of the invention, the command file comprises an instruction to restart an application of the device, the application being associated with an identified memory area that is associated with at least one of the one or more operations.

According to an embodiment of the invention, the command file comprises an instruction to reboot the device after performing one of the one or more operations.

According to an embodiment of the invention, the memory associated with the device comprises flash memory.

According to an embodiment of the invention, the one or more identified operations comprise one or more operations identified within the command file as having different data than data currently stored at the memory area associated with the operation.

According to an embodiment of the invention, the command file identifies a predetermined maximum number of attempts to make for performing one or more of the identified operations.

An embodiment of the invention described herein may include an apparatus comprising: (a) an extraction module configured to retrieve a command file from a download package; and (b) an update module configured to: (i) identify one or more operations that are identified within the command file; (ii) for each respective one operation of the one or more operations, identify a memory area associated with the respective one operation, wherein the memory area comprises a portion of device memory; and (iii) perform each of the one or more operations, wherein each respective one operation of the one or more operations is performed on the memory area associated with the respective one operation.

An embodiment of the invention described herein may include one or more non-transitory computer readable media having instructions operable to cause one or more processors to perform the operations comprising: (a) retrieving a command file from a download package, wherein the command file is retrieved at a device receiving the download package; (b) identifying one or more operations that are identified within the command file; (c) for each respective one operation of the one or more operations, identifying a memory area associated with the respective one operation, wherein the memory area comprises a portion of memory associated with the device; and (d) performing each of the one or more operations, wherein each respective one operation of the one or more operations is performed on the memory area associated with the respective one operation.

FIG. 1 is a block diagram illustrating an example network environment 100 operable to facilitate the updating of memory at a device based upon a custom command file. In embodiments, a customer premise equipment (CPE) device 105 may receive and/or deliver one or more services (e.g., video, data, voice, security, and/or other service(s)) to a subscriber. The CPE device 105 may include a set-top box (STB), multimedia gateway device, modem, router, wireless extender, tablet, computer, mobile device, and/or any other device configured to receive and/or deliver a service to a subscriber.

In embodiments, the CPE device 105 may receive the one or more services and may transmit and receive other communications to and from one or more upstream network components through an access network 110 and a wide-area network (WAN) 115. The access network 110 may include any of a variety of communication links between the CPE device 105 and a WAN 115, such as a hybrid-fiber coaxial (HFC) network, phone line(s) connected to a digital subscriber line access multiplexer (DSLAM), wireless communication network, and others.

In embodiments, a CPE device 105 may receive updates, such as software and firmware updates remotely from an upstream server. For example, a CPE update server 120 may generate and transmit software and firmware loads through one or more networks to one or more CPE devices 105. The CPE update server 120 may include a code download server, an electronic program guide (EPG) data server, a video hub office server, or any other server configured to generate and transmit an update file to a CPE device 105.

In embodiments, the CPE update server 120 may package software code, firmware code, or other data (e.g., EPG data) into a download package, and the download package may include a command file. The command file may contain executable or predefined instructions or operation codes directing a CPE device 105 to replace, update, or modify selected portions of memory (i.e., flash memory) associated with the device. The selected portions may include only those locations within the memory where currently residing code or data differs from corresponding code or data carried within the download package.

In embodiments, the command file may include an identification of one or more operations that constitute updates or modifications to one or more memory areas of the CPE device 105. For example, the command file may identify a most recent (i.e., update) version associated with a memory area and current version of data that is currently stored within the corresponding memory area, and the CPE device 105 may carry out only those operations within the command file that have a current version that is different from a corresponding update version.

Operations identified within the command file may include various operations such as replacing, removing, and/or adding data to an identified memory area, refreshing or rebooting memory or one or more portions of memory at the CPE device 105, initiating a predefined operation, restarting a predefined operation, and/or carrying out a complete upgrade of the entire device memory. Each operation identified within the command file may be associated with a specific memory area, the specific memory area being only that portion of the device memory that is to be affected by the respective operation. The command file may further provide additional instructions associated with the operations. For example, the command file may define a predefined number of attempts after which the operation(s) can be ignored.

In embodiments, when a download package carrying a command file is received at a CPE device 105, the CPE device 105 may extract the command file from the download package, identify one or more operations for carrying out on memory of the CPE device 105, and perform each of the identified one or more operations at a respective portion (i.e., subset or less than all) of the device memory. For example, the CPE device 105 may be configured to identify only those operations associated with a current version and update version that have different values or identifiers. Rather than update or load code over the entirety of the device memory, the CPE device 105 may be configured to only insert, replace, remove, or otherwise modify code at selected portions of the memory as dictated by the command file.

In embodiments, the command file may include identifications of old versions of a code section and a corresponding new or current version of the code section. A CPE device 105 receiving the command file may identify a version of a currently stored code section, and if the version of the currently stored code section is different from the new version of the code section as identified within the command file, the CPE device 105 may follow the corresponding instructions in the command file to update the code section accordingly. For example, the CPE device 105 may carry out only those operations within the command file that are associated with a new version identifier that is different from a corresponding current version identifier of the code loaded at the CPE device 105.

Figure 2:
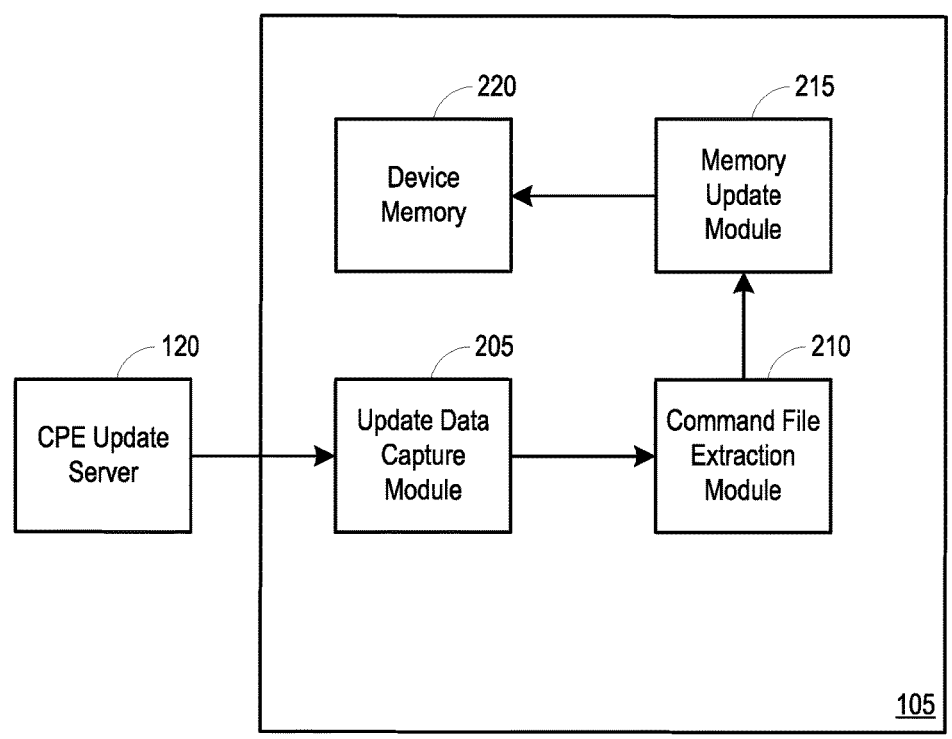
FIG. 2 is a block diagram illustrating an example customer premise equipment (CPE) device operable to facilitate the updating of memory at a device based upon a custom command file.

FIG. 2 is a block diagram illustrating an example CPE device 105 operable to facilitate the updating of memory at a device based upon a custom command file. The CPE device 105 may communicate with a CPE update server 120 over a secure connection. For example, a secure connection may include a virtual private network (VPN), secured physical connection, or any other connection utilizing dedicated connections, and/or traffic encryptions. In embodiments, the CPE device 105 may include an update data capture module 205, a command file extraction module 210, a memory update module 215, and device memory 220.

In embodiments, the CPE device 105 may receive updates, such as software and firmware updates remotely from the CPE update server 120. The CPE update server 120 may package software code, firmware code, or other data (e.g., EPG data) into a download package, and the download package may include a command file. The command file may contain executable or predefined instructions or operation codes directing a CPE device 105 to replace, update, or modify selected portions of memory (i.e., flash memory) associated with the device. The selected portions may include only those locations within the memory where currently residing code or data differs from corresponding code or data carried within the download package.

In embodiments, the command file may include an identification of one or more operations that constitute updates or modifications to one or more memory areas of the CPE device 105 (e.g., memory area(s) of the device memory 220). For example, the command file may identify a most recent (i.e., update) version associated with a memory area and current version of data that is currently stored within the corresponding memory area, and the memory update module 215 may be configured to identify and carry out only those operations within the command file that have a current version that is different from a corresponding update version.

Operations identified within the command file may include various operations such as replacing, removing, and/or adding data to an identified memory area within device memory 220, refreshing or rebooting device memory 220 or one or more portions of the device memory 220, initiating a predefined operation, restarting a predefined operation, and/or carrying out a complete upgrade of the entire device memory 220. Each operation identified within the command file may be associated with a specific memory area, the specific memory area being only that portion of the device memory 220 that is to be affected by the respective operation.

In embodiments, a download package carrying a command file may be received by the update data capture module 205, and the command file extraction module 210 may extract the command file from the download package. The memory update module 215 may identify one or more operations for carrying out on device memory 220, and may perform each of the identified one or more operations at a respective portion (i.e., subset or less than all) of the device memory 220. For example, the memory update module 215 may be configured to identify only those operations associated with a current version and update version that have different values or identifiers. Rather than update or load code over the entirety of the device memory 220, the memory update module 215 may be configured to only insert, replace, remove, or otherwise modify code at selected portions of the memory as dictated by the command file.

Figure 3:
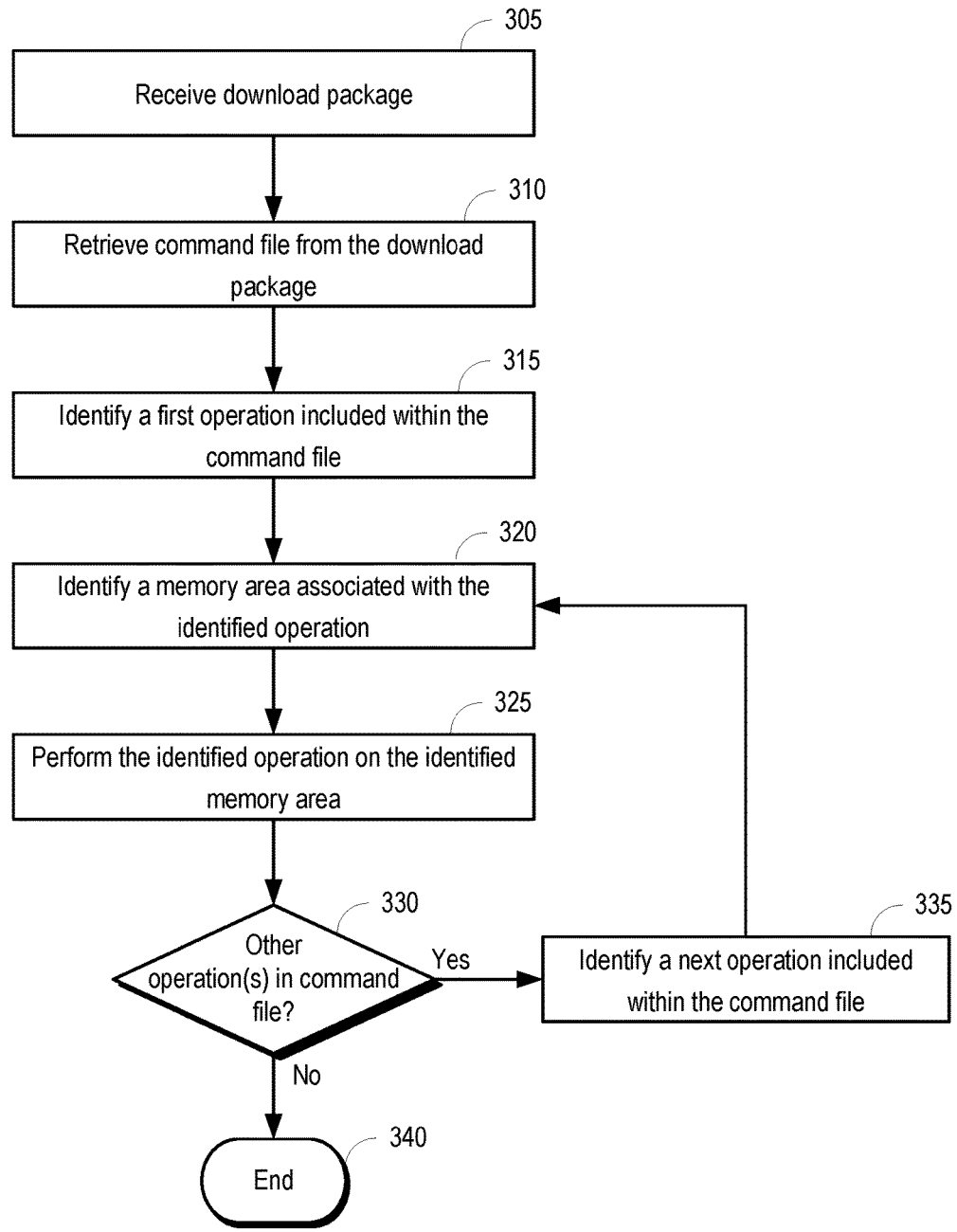
FIG. 3 is a flowchart illustrating an example process operable to facilitate the updating of memory at a device based upon a custom command file.

FIG. 3 is a flowchart illustrating an example process 300 operable to facilitate the updating of memory at a device based upon a custom command file. The process 300 can begin at 305 when a download package is received at a device (e.g., CPE device 105 of FIG. 1). The download package may be received, for example, by the update data capture module 205 of FIG. 2. In embodiments, the download package may be received at the device as an image, and the image may be a single image or a monolithic image (i.e., an image including a plurality of sub-images).

At 310, a command file may be retrieved from the download package. The command file may be retrieved, for example, by the command file extraction module 210 of FIG. 2. In embodiments, the command file may include one or more operations and an identification of a memory area associated with each respective one of the one or more operations. For example, operations identified within the command file may include instructions to write, delete and/or replace data from an associated portion of memory (e.g., device memory 220 of FIG. 2). The command file may include other instructions for updating device memory including, but not limited to instructions for refreshing and/or rebooting the device memory or a portion of the device memory after updating the device memory.

At 315, a first operation included within the command file may be identified. The first operation may be identified, for example, by the memory update module 215 of FIG. 2. In embodiments, the command file may include one or more operations within a list or table. Each of the one or more operations may identify one or more actions to be performed on a portion of device memory (e.g., device memory 220 of FIG. 2). In embodiments, the identified operation may be an operation associated with an identifier of a new version, wherein the identifier of the new version is different from a version identifier of an object version that is currently loaded at a corresponding portion of the device memory 220.

At 320, a memory area associated with the identified operation may be identified. The memory area may be identified, for example, by the memory update module 215 of FIG. 2. In embodiments, the identified memory area may be one or more objects or data that is stored in a portion of the memory of the device (e.g., CPE device 105 of FIG. 1). The identified memory area may be the portion of device memory (e.g., device memory 220 of FIG. 2) upon which the associated operation is to be performed. It should be understood that the identified memory area may be a subset, or less than all, of the memory of the device.

At 325, the identified operation may be carried out on the identified memory area. The identified operation may be carried out on a portion of the device memory (e.g., device memory 220 of FIG. 2), for example, by the memory update module 215 of FIG. 2. It should be understood that the identified operation may include a variety of operations, instructions, and/or commands, including but not limited to writing, deleting, and replacing data within the identified memory area, and/or rebooting or refreshing the device memory or portion(s) of the device memory.

At 330, a determination may be made whether another operation is included within the command file. If another operation that has not yet been performed on the device memory is included within the command file, the process 300 may proceed to 335. At 335, a next operation included within the command file may be identified, for example, by the memory update module 215 of FIG. 2.

Returning to 330, if the determination is made that another operation that has not yet been performed on the device memory is not included within the command file, the process 300 may end at 340.

Figure 4:
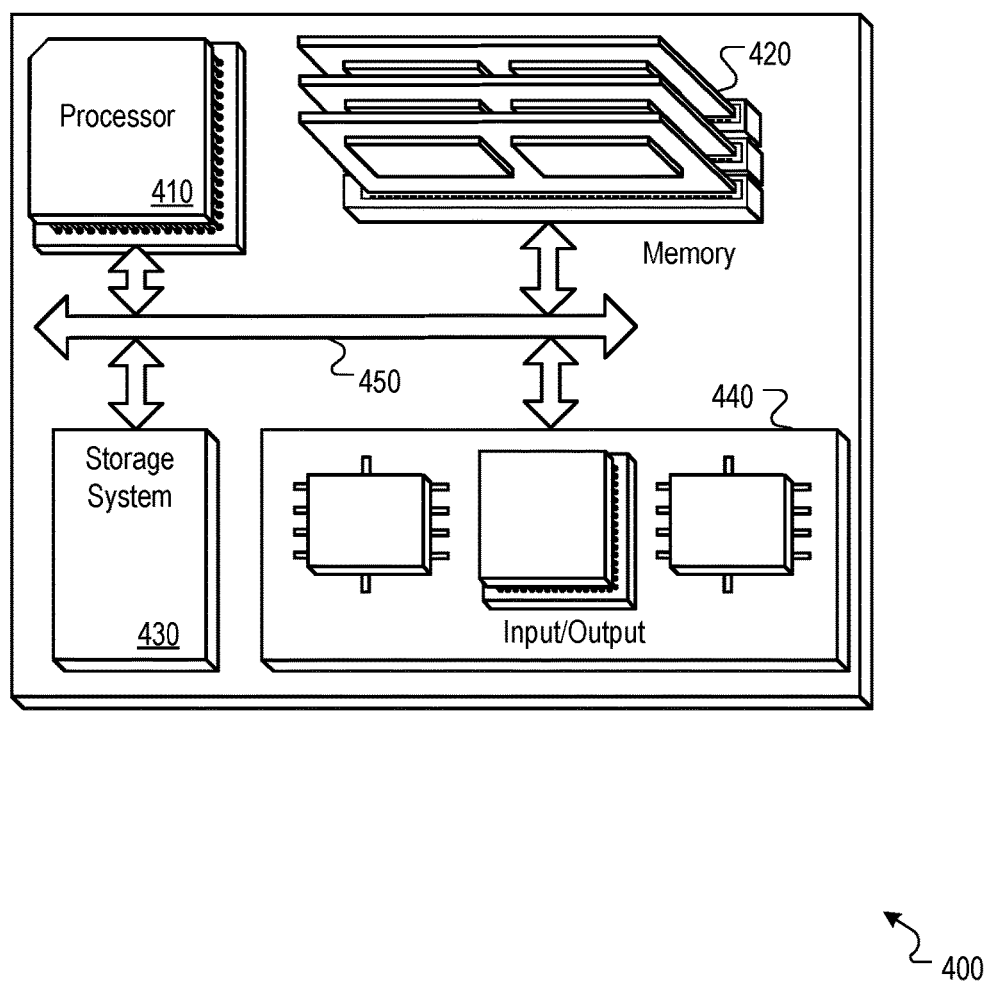
FIG. 4 is a block diagram of a hardware configuration operable to facilitate the updating of memory at a device based upon a custom command file.

FIG. 4 is a block diagram of a hardware configuration 400 operable to facilitate the updating of memory at a device based upon a custom command file. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multithreaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit.

In some implementations, the storage device 430 can be capable of providing mass storage for the hardware configuration 400. In one implementation, the storage device 430 can be a computer-readable medium. In various different implementations, the storage device 430 can, for example, include a hard disk device, an optical disk device, flash memory or some other large capacity storage device. In other implementations, the storage device 430 can be a device external to the hardware configuration 400.

The input/output device 440 provides input/output operations for the hardware configuration 400. In embodiments, the input/output device 440 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video, voice, data, and/or other services to a device (e.g., television, computer, tablet, mobile device, STB, access point, etc.). In embodiments, the input/output device can include driver devices configured to send communications to, and receive communications from one or more networks (e.g., access network 110 of FIG. 1, WAN 115 of FIG. 1, etc.).

Those skilled in the art will appreciate that the invention improves upon methods and systems for updating memory at a device. Methods, systems, and computer readable media can be operable to facilitate the updating of memory at a device based upon a custom command file. In embodiments, update or configuration codes or data may be delivered to a device within a download package, and the download package may include a command file. The command file may identify one or more operations that are to be carried out on the memory of the device, and each respective one of the one or more operations may be associated with a subset or portion of the memory of the device. The device may identify the one or more operations and the one or more associated memory areas from the command file, and the device may carry out the one or more operations on only those areas of the device memory that are identified from the command file as being associated with the operations.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
retrieving a command file from a download package, wherein the command file is retrieved at a device receiving the download package, wherein the command file comprises an identification of one or more operations, an identification of a memory area associated with each of the one or more operations, wherein the memory area comprises a portion of memory associated with the device, and an identification of an update version associated with each of the one or more operations;
selecting one or more operations from the one or more operations that are identified within the command file, wherein selecting each respective one operation of the one or more selected operations comprises:
identifying, from the command file, the memory area associated with the respective one operation and the update version associated with the respective one operations;
identifying a current version of an object loaded at a memory portion of the device, the memory portion corresponding with the memory area associated with the respective one operation;
comparing the update version associated with the respective one operation to the current version of the object loaded at the memory portion of the device;
determining that the update version associated with the respective one operation is different than the current version of the object loaded at the memory portion of the device; and
selecting the respective one operation as an operation to be performed;
performing each of the one or more selected operations, wherein each respective one operation of the one or more selected operations is performed on the memory area associated with the respective one operation.

2. The method of claim 1, wherein the command file comprises an instruction to restart an application of the device, the application being associated with an identified memory area that is associated with at least one of the one or more selected operations.

3. The method of claim 1, wherein the command file comprises an instruction to reboot the device after performing one of the one or more selected operations.

4. The method of claim 1, wherein the memory associated with the device comprises flash memory.

5. The method of claim 1, wherein the one or more identified operations comprise one or more operations identified within the command file as having different data than data currently stored at the memory area associated with the operation.

6. The method of claim 1, wherein the command file identifies a predetermined maximum number of attempts to make for performing one or more of the selected operations.

7. An apparatus comprising:
an extraction module configured to retrieve a command file from a download package, wherein the command file comprises an identification of one or more operations, an identification of a memory area associated with each of the one or more operations, wherein the memory area comprises a portion of device memory, and an identification of an update version associated with each of the one or more operations; and
an update module configured to:
select one or more operations from the one or more operations that are identified within the command file, wherein selecting each respective one operation of the one or more selected operations comprises:
identifying, from the command file, the memory area associated with the respective one operation and the update version associated with the respective one operations;
identifying a current version of an object loaded at a memory portion of the device, the memory portion corresponding with the memory area associated with the respective one operation;
comparing the update version associated with the respective one operation to the current version of the object loaded at the memory portion of the device;
determining that the update version associated with the respective one operation is different than the current version of the object loaded at the memory portion of the device; and
selecting the respective one operation as an operation to be performed;
perform each of the one or more selected operations, wherein each respective one operation of the one or more selected operations is performed on the memory area associated with the respective one operation.

8. The apparatus of claim 7, wherein the command file comprises an instruction to restart an application, the application being associated with an identified memory area that is associated with at least one of the one or more selected operations.

9. The apparatus of claim 7, wherein the device memory comprises flash memory.

10. The apparatus of claim 7, wherein the one or more identified operations comprise one or more operations identified within the command file as having different data than data currently stored at the memory area associated with the operation.

11. The apparatus of claim 7, wherein the command file identifies a predetermined maximum number of attempts to make for performing one or more of the selected operations.

12. One or more non-transitory computer readable media having instructions operable to cause one or more processors to perform the operations comprising:
retrieving a command file from a download package, wherein the command file is retrieved at a device receiving the download package, wherein the command file comprises an identification of one or more operations, an identification of a memory area associated with each of the one or more operations, wherein the memory area comprises a portion of memory associated with the device, and an identification of an update version associated with each of the one or more operations;

selecting one or more operations from the one or more operations that are identified within the command file, wherein selecting each respective one operation of the one or more selected operations comprises:
  identifying, from the command file, the memory area associated with the respective one operation and the update version associated with the respective one operations;
  identifying a current version of an object loaded at a memory portion of the device, the memory portion corresponding with the memory area associated with the respective one operation;
  comparing the update version associated with the respective one operation to the current version of the object loaded at the memory portion of the device;
  determining that the update version associated with the respective one operation is different than the current version of the object loaded at the memory portion of the device; and
  selecting the respective one operation as an operation to be performed;
performing each of the one or more selected operations, wherein each respective one operation of the one or more selected operations is performed on the memory area associated with the respective one operation.

13. The one or more non-transitory computer-readable media of claim 12, wherein the command file comprises an instruction to restart an application of the device, the application being associated with an identified memory area that is associated with at least one of the one or more selected operations.

14. The one or more non-transitory computer-readable media of claim 12, wherein the command file comprises an instruction to reboot the device after performing one of the one or more selected operations.

15. The one or more non-transitory computer-readable media of claim 12, wherein the memory associated with the device comprises flash memory.

16. The one or more non-transitory computer-readable media of claim 12, wherein the one or more identified operations comprise one or more operations identified within the command file as having different data than data currently stored at the memory area associated with the operation.

17. The one or more non-transitory computer-readable media of claim 12, wherein the command file identifies a predetermined maximum number of attempts to make for performing one or more of the selected operations.

* * * * *